United States Patent
Kasashima et al.

(10) Patent No.: US 8,733,336 B2
(45) Date of Patent: May 27, 2014

(54) OUTER BLADE CUTTING WHEEL AND MAKING METHOD

(75) Inventors: Masaki Kasashima, Echizen (JP); Takehisa Minowa, Echizen (JP); Takaharu Yamaguchi, Echizen (JP); Koji Sato, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/493,539

(22) Filed: Jun. 11, 2012

(65) Prior Publication Data

US 2012/0252330 A1 Oct. 4, 2012

Related U.S. Application Data

(62) Division of application No. 12/342,941, filed on Dec. 23, 2008, now Pat. No. 8,459,246.

(30) Foreign Application Priority Data

Dec. 28, 2007 (JP) ................................. 2007-339212

(51) Int. Cl.
*B28D 1/04* (2006.01)

(52) U.S. Cl.
USPC .............................................. 125/15; 51/309

(58) Field of Classification Search
USPC ............................................. 125/15; 51/309
See application file for complete search history.

(56) References Cited

U.S. PATENT DOCUMENTS

| | | | |
|---|---|---|---|
| 2,562,587 A * | 7/1951 | Swearingen .................. | 433/166 |
| 2,662,957 A | 12/1953 | Eisler | |
| 3,088,195 A | 5/1963 | Noethlich, Jr. et al. | |
| 4,547,998 A | 10/1985 | Kajiyama | |
| 6,012,977 A * | 1/2000 | Yoshikawa et al. ........... | 451/541 |
| 6,408,838 B1 | 6/2002 | Ogata et al. | |
| 6,517,427 B1 | 2/2003 | Yoshikawa et al. | |
| 2005/0260939 A1 | 11/2005 | Andrews et al. | |
| 2007/0023026 A1 | 2/2007 | Michelle | |

(Continued)

FOREIGN PATENT DOCUMENTS

| | | | |
|---|---|---|---|
| JP | 7-207254 A | 8/1995 | |
| JP | 9-174441 A | 7/1997 | |

(Continued)

OTHER PUBLICATIONS

Japanese Office Action dated Nov. 14, 2012, issued in corresponding Japanese patent application No. 2008-321712.

(Continued)

*Primary Examiner* — Maurina Rachuba
(74) *Attorney, Agent, or Firm* — Westerman, Hattori, Daniels & Adrian, LLP (57) ABSTRACT

In an outer blade cutting wheel comprising an annular thin disc base of cemented carbide having an outer diameter of 80-200 mm, an inner diameter of 30-80 mm, and a thickness of 0.1-1.0 mm, and a blade section disposed on an outer periphery of the base, the blade section comprises diamond grains and/or CBN grains bound with a metal bond having a Young's modulus of $0.7-4.0 \times 10^{11}$ Pa and has a thickness which is greater than the thickness of the base by at least 0.01 mm. The outer blade cutting wheel is capable of cutting a workpiece at a high accuracy and a reduced allowance, improves machining yields, and reduces machining costs.

4 Claims, 6 Drawing Sheets

(56) References Cited

U.S. PATENT DOCUMENTS

| | | |
|---|---|---|
| 2008/0076338 A1 | 3/2008 | Andrews et al. |
| 2008/0202488 A1 | 8/2008 | Kim et al. |
| 2009/0151267 A1 | 6/2009 | Upadhyay et al. |

FOREIGN PATENT DOCUMENTS

| | | |
|---|---|---|
| JP | 10-175152 A | 6/1998 |
| JP | 10-175171 A | 6/1998 |
| JP | 10-175172 A | 6/1998 |
| JP | 2002-86360 A | 3/2002 |
| JP | 2003-326466 A | 11/2003 |

OTHER PUBLICATIONS

Extended European Search Report dated Aug. 7, 2012, issued in corresponding European Patent Application No. 08254151.7 (6 pages).

* cited by examiner

OUTER BLADE CUTTING WHEEL AND MAKING METHOD

CROSS-REFERENCE TO RELATED APPLICATION

This application is a division of U.S. application Ser. No. 12/342,941, filed on Dec. 24, 2008 which is based upon and claims priority under 35 U.S.C. §119(a) on Patent Application No. 2007-339212 filed in Japan on Dec. 28, 2007, the entire contents of which are hereby incorporated by reference.

TECHNICAL FIELD

This invention relates to an outer blade cutting wheel for cutting rare earth sintered magnets, and a method for preparing the same.

BACKGROUND ART

Outer blade cutting wheels for cutting rare earth sintered magnets are disclosed in JP-A 9-174441, JP-A 10-175171, and JP-A 10-175172 as comprising a cemented carbide base having an outer periphery to which diamond abrasive grains are bonded with phenolic resins or the like. Since diamond grains are bonded to the cemented carbide base, the base is improved in mechanical strength over prior art alloy tool steel and high-speed steel, leading to a higher accuracy of machining. Also by reducing the thickness of the blade with using a cemented carbide base, the yield of machining can be improved and the machining speed be accelerated. While these cutting wheels using cemented carbide bases show better cutting performance than prior art outer blade cutting wheels, the market poses an increasing demand to reduce the cost of cutting wheels. It would be desirable to have a novel high-performance cutting-off wheel overwhelming the prior art outer blade cutting wheels.

While various cutting techniques including outer blade cutting-off, inner blade cutting-off and wire saw cutting-off techniques are implemented in machining rare earth permanent magnets or sintered magnets, the outer blade cutting-off technique is most widely employed. By virtue of many advantages including an inexpensive cutting wheel, an acceptable cutting allowance on use of hardmetal blades, a high accuracy, a relatively high machining speed, and a mass scale of manufacture, the outer blade cutting-off technique is widely employed in cutting of rare earth sintered magnets.

Traditional cutting wheels for outer blade cutting used bases made of steel alloy materials such as alloy tool steels (e.g., SKD grade in JIS) and high-speed steels in the art. However, JP-A 9-174441, JP-A 10-175171, and JP-A 10-175172 (the inventors including the same as the present) disclose cutting wheels using bases of cemented carbides. Cemented carbides made by cementing tungsten carbide (WC) grains in a binder matrix of cobalt or nickel metal by sintering are robust materials having a Young's modulus as high as 450 to 700 GPa and extraordinarily stronger than the steel alloy materials having a Young's modulus of the order of 200 GPa.

A high Young's modulus implies that the quantity of deformation of a blade under a cutting force (or cutting resistance) is reduced. This, in turn, implies that under the same cutting force, the deflection of the blade is reduced, and that for the same deflection of the blade, the same accuracy of cutting is possible even when the thickness of the blade is decreased. Although the cutting force applied per unit area of the blade remains substantially unchanged, the overall cutting force applied to the blade becomes smaller by the thickness decrease. In the multiple machining process where a magnet block is machined into multiple pieces at a time by a cutter assembly comprising a multiplicity of cutting wheels, the total cutting force applied to the cutter assembly is reduced. This allows the number of cutting wheels to be increased for a motor of the same power, or the cutting force to be reduced for the same number of cutting wheels, leading to a saving of the motor power. If the motor power has a margin relative to the cutting force, the advance of the cutting wheel assembly may be accelerated to shorten the cutting time required.

The use of high-modulus cemented carbide bases considerably improved the productivity of outer blade cutting. However, the market imposes an ever increasing demand on rare earth sintered magnets, with manufacturers entering into keen competition toward cost reduction. For effective utilization of rare earth permanent magnet material, the smaller the cutting allowance, the higher becomes the material utilization yield. The higher the machining speed, the more is improved the productivity. It would be desirable to have an outer blade cutting wheel which offers a high modulus and high accuracy despite a reduced thickness of blade relative to the current cemented carbide base cutting wheels.

DISCLOSURE OF THE INVENTION

An object of the invention is to provide an outer blade cutting wheel which is capable of cutting at a high accuracy and a reduced allowance while achieving improved machining yields and reduced machining costs, and a method for preparing the same.

The invention relates to an outer blade cutting wheel comprising a base made of cemented carbide. A metal bond having a higher strength and higher modulus is used to bind abrasive grains comprising diamond grains, CBN grains or a mixture of diamond grains and CBN grains to the outer periphery of the base, thereby improving the mechanical strength of the blade section and the overall mechanical rigidity of the outer blade cutting wheel. The invention thus succeeds in reducing the thickness of the blade section and accelerating the cutting speed.

In one aspect, the invention provides an outer blade cutting wheel comprising a base in the form of an annular thin disc of cemented carbide having an outer diameter of 80 to 200 mm defining an outer periphery, an inner diameter of 30 to 80 mm defining a bore, and a thickness of 0.1 to 1.0 mm, and a blade section disposed on the outer periphery of the base and comprising abrasive grains bound with a metal bond, the abrasive grains comprising diamond grains, CBN grains or a mixture of diamond grains and CBN grains, the metal bond having a Young's modulus of $0.7 \times 10^{11}$ to $4.0 \times 10^{11}$ Pa, the blade section having a thickness which is greater than the thickness of the base by at least 0.01 mm.

In a preferred embodiment, the metal bond has a Vickers hardness of 100 to 550 and a density of 2.5 to 12 g/cm$^3$. Typically, the metal bond comprises at least one metal selected from the group consisting of Ni, Fe, Co, Cu, and Sn, an alloy comprising at least two of the foregoing metals, or an alloy comprising at least one of the foregoing metals and phosphorus.

In a preferred embodiment, the blade section is formed by electroplating the metal bond so that the metal bond is deposited on the outer periphery of the base while binding the abrasive grains therewith. More preferably, the metal bond as deposited on the base by electroplating has an internal residual stress between $-2 \times 10^8$ Pa and $2 \times 10^8$ Pa.

In another preferred embodiment, the blade section is formed by brazing the abrasive grains so that the metal bond is affixed to the outer periphery of the base while binding the abrasive grains therewith.

In a second aspect, the invention provides a method for preparing an outer blade cutting wheel comprising providing a base in the form of an annular thin disc of cemented carbide having an outer diameter of 80 to 200 mm defining an outer periphery, an inner diameter of 30 to 80 mm, and a thickness of 0.1 to 1.0 mm; and electroplating a metal bond together with abrasive grains to deposit on the outer periphery of the base an electroplated layer in which the abrasive grains are bound with the metal bond, the abrasive grains comprising diamond grains, CBN grains or a mixture of diamond grains and CBN grains, the metal bond having a Young's modulus of $0.7 \times 10^{11}$ to $4.0 \times 10^{11}$ Pa, the electroplated layer having a thickness which is greater than the thickness of the base by at least 0.01 mm and serving as a blade section. Preferably, the metal bond as deposited on the base by electroplating has an internal residual stress between $-2 \times 10^8$ Pa and $2 \times 10^8$ Pa.

In a third aspect, the invention provides a method for preparing an outer blade cutting wheel comprising providing a base in the form of an annular thin disc of cemented carbide having an outer diameter of 80 to 200 mm defining an outer periphery, an inner diameter of 30 to 80 mm, and a thickness of 0.1 to 1.0 mm; and brazing abrasive grains with a metal bond onto the outer periphery of the base to form a layer in which the abrasive grains are bound with the metal bond, the abrasive grains comprising diamond grains, CBN grains or a mixture of diamond grains and CBN grains, the metal bond having a Young's modulus of $0.7 \times 10^{11}$ to $4.0 \times 10^{11}$ Pa, the layer having a thickness which is greater than the thickness of the base by at least 0.01 mm and serving as a blade section.

In a preferred embodiment, the metal bond has a Vickers hardness of 100 to 550 and a density of 2.5 to 12 g/cm$^3$. Typically, the metal bond comprises at least one metal selected from the group consisting of Ni, Fe, Co, Cu, and Sn, an alloy comprising at least two of the foregoing metals, or an alloy comprising at least one of the foregoing metals and phosphorus.

As stated in the preamble, most outer blade cutting wheels used in the art for cutting rare earth sintered magnets are resinoid-bonded diamond cutting wheels having diamond abrasive grains bound with phenolic resins or the like. For the purposes of improving the yield and reducing the cost of machining rare earth sintered magnets, it is desired to reduce the thickness of the peripheral blade section and to accelerate the cutting speed.

In efforts to meet these requirements, the inventors paid attention to the bond used to bind abrasive grains to the periphery of a cemented carbide base. The outer blade cutting wheel consists essentially of a cemented carbide base as a base wheel and a blade section of bound abrasive grains. The blade section includes abrasive grains in the form of diamond grains, CBN grains or a mixture of diamond grains and CBN grains, and a bond for binding the abrasive grains to the base. The bond functions to retain abrasive grains and to bind abrasive grains to the base, so as to withstand the rotational force and the grinding resistance during cutting operation, thus accomplishing cutting of workpieces.

The form and role of bond are described. One important factor for the bond is that the blade section formed by the bond is disposed on the outer periphery of a base so as to straddle the outer rim of the base. The portion (or legs) of the blade section that straddles the outer rim of the base may be an abrasive layer of abrasive grains in admixture with the bond or a layer of the bond alone, depending on the nature of workpiece material or a cutting purpose. Consequently, the thickness of the blade section is greater than that of the base. Such a shape is taken for two reasons. One reason is to increase the bond-base contact area to achieve a firm engagement. If the blade section is configured so as to contact only the end face of the base, the bond is expected to achieve an insufficient bond strength to the base so that the blade section will readily separate from the base. When the blade section is disposed so as to straddle the base rim, the bond-base contact area is increased to provide a sufficient bond strength between the base and the bond.

The other reason is to provide for ease of escape of grinding fluid and cutting sludge. The configuration of the blade section which is thicker than the base means that there is a gap between the base and the workpiece (typically magnet) at a position inside the blade section. This gap is very important in cutting operation because the grinding fluid will enter the gap which gives a passage for removing the heat of friction generated between the workpiece and the blade section and flowing away the grinding fluid with the swarf sludge entrained thereon. Absent the gap, swarf sludge as cut off will be captured or engaged between the blade section and the workpiece to cause substantial friction, and the grinding fluid will not reach the blade tip, failing to release the heat of friction and to continue cutting operation.

The hardness of the bond is also important. As abrasive grains of diamond or CBN are rounded on their edges to increase cutting resistance, the abrasive grains will shed under the external force. At sites where abrasive grains have shed, the bond must be abraded by the workpiece (rare earth sintered magnet) so that abrasive grains buried underneath may emerge from below. When abrasive grains shed or are abraded away, only the bond is left on the surface of the blade section, and the bond portion from which abrasive grains are lost must be scraped off. As the bond is scraped by the workpiece, new abrasive grains emerge by themselves from below. If this cycle is repeated, fresh sharp cutting edges are automatically regenerated (known as "self-sharpening").

The invention has succeeded in developing a high-performance outer blade cutting wheel by studying the characteristics required for the bond in the blade section and tailoring the bond so as to meet the requirement.

Specifically, the mechanical nature of the bond used in the blade section is improved to enhance the overall mechanical strength of the outer blade cutting wheel. In this way, a high-performance, high-strength cutting wheel is provided. While resin bonds of phenolic resins or the like are most commonly used in the art, they are scarcely expected to exert their own mechanical strength because of the resinous or plastic nature. According to the invention, a blade section is formed using as the bond a single metal or metal alloy having excellent mechanical strength rather than the resins or plastics, whereby the blade section is improved in mechanical properties, and at the same time, the strength of the base is reinforced. In this way, a high-performance outer blade cutting wheel with improved mechanical rigidity or robustness is provided.

The patent references cited above, in part, refer to electrodeposition and metal bond, but not to necessary mechanical properties and concomitant benefits. The mechanical strength of the blade section on the outer periphery of the base is enhanced according to the invention because the blade section comes in direct contact with the workpiece and must be thicker than the base, and because the blade section is best for facilitating mechanical reinforcement of the base. Enclosing the rim of the base with a thick metal material so as to reinforce the base is most effective in improving the mechanical properties of the whole base.

The outer blade cutting wheel of the invention is capable of cutting at a high accuracy and a reduced allowance, improves machining yields, and reduces machining costs.

BRIEF DESCRIPTION OF THE DRAWINGS

FIG. 1 schematically illustrates an outer blade cutting wheel in one embodiment of the invention, FIG. 1A being a plan view, FIG. 1B being a cross-sectional view taken along lines B-B in FIG. 1A, FIGS. 1C, 1D and 1E being enlarged views of different examples of the blade section on the base rim.

DESCRIPTION OF THE PREFERRED EMBODIMENT

Referring to FIG. 1, the outer blade cutting wheel in one embodiment of the invention is illustrated as comprising a base 10 in the form of an annular thin disc made of cemented carbide and a blade section 20 disposed on the outer periphery of the base 10. The blade section 20 comprises abrasive grains bound with a metal bond, the abrasive grains comprising diamond grains, CBN grains or a mixture of diamond grains and CBN grains.

The base 10 is in the form of an annular thin disc (differently stated, a doughnut-shaped thin plate or circular thin plate having a center bore 12) having an outer diameter of 80 to 200 mm, preferably 100 to 180 mm, defining an outer periphery, an inner diameter of 30 to 80 mm, preferably 40 to 70 mm, defining the bore 12, and a thickness of 0.1 to 1.0 mm, preferably 0.2 to 0.8 mm.

It is noted that the disc has a center bore and an outer circumference as shown in FIG. 1. Thus, the terms "radial" and "axial" are used relative to the center of the disc, and so, the thickness is an axial dimension, and the length (or height) is a radial dimension.

Examples of the cemented carbide of which the base is made include those in which powder carbides of metals in Groups IVB, VB, and VIB of the Periodic Table such as WC, TiC, MoC, NbC, TaC and $Cr_3C_2$ are cemented in a binder matrix of Fe, Co, Ni, Mo, Cu, Pb, Sn or a metal alloy thereof, by sintering. Among these, typical WC—Co, WC—Ti, C—Co, and WC—TiC—TaC—Co systems are preferred. Also, those cemented carbides which have an electric conductivity sufficient to electroplating or which can be given such electric conductivity with palladium catalysts or the like are preferred. When cemented carbides are given an electric conductivity with palladium catalysts or the like, well-known agents such as conductive treating agents used in plating of ABS resins may be employed.

In the invention, the metal bond is used to form the blade section 20. The metal bond should have a Young's modulus of $0.7\times10^{11}$ to $4.0\times10^{11}$ Pa, and preferably $0.8\times10^{11}$ to $3.6\times10^{11}$ Pa. If the metal bond has a Young's modulus of less than $0.7\times10^{11}$ Pa, the blade section can be deflected by the cutting resistance that it receives during high-speed cutting, resulting in the cutting face being warped or undulated. If the metal bond has a Young's modulus of more than $4.0\times10^{11}$ Pa, the blade section is little deformed like the base, which is preferable for high accuracy cutting; however, the metal bond has a higher hardness at the same time so that when abrasive grains are abraded away or shed, self-sharpening of a cutting edge does not occur for the above-described reason, resulting in a decline of cutting performance.

It is noted that the Young's modulus is determined by molding the bond alone into a part of suitable dimensions, working the part into a specimen of measurement dimensions, placing the specimen in a thermostat chamber, and measuring by the resonance method.

The metal bond used herein preferably has a Vickers hardness of 100 to 550 and a density of 2.5 to 12 $g/cm^3$. A choice of hardness is made in consideration of rare earth sintered magnets having a Vickers hardness of about 600 to about 800. If the blade section is formed using the bond having a lower hardness than the workpiece or rare earth sintered magnet, the bond can be abraded by the workpiece when necessary, facilitating self-sharpening or self-emergence of abrasive grains. With respect to the density of metal bond which is correlated to Vickers hardness, if the density is less than 2.5 $g/cm^3$ and hence, lower than that of diamond and CBN, the bond may be low in strength to bind abrasive grains, allowing abrasive grains to shed. If the density is more than 12 $g/cm^3$ and hence, equal to or greater than that of cemented carbide of which the base is made, the blade section may have a lower binding strength and become susceptible to chipping and shedding.

Vickers hardness is measured by a commercially available micro-Vickers hardness tester because a specimen is so thin that the influence of thickness must be minimized.

The metal bond used herein is at least one metal selected from the group consisting of Ni, Fe, Co, Cu, and Sn, an alloy comprising at least two of the foregoing metals, or an alloy comprising at least one of the foregoing metals and phosphorus.

The abrasive grains used herein are diamond grains (including natural diamond and industrial synthetic diamond), cubic boron nitride (CBN) grains, or a mixture of diamond grains and CBN grains.

The size of abrasive grains depends on the thickness of the base to which abrasive grains are bound. Preferably abrasive grains have an average particle size of 10 to 500 μm. If the average particle size is less than 10 μm, there may be left smaller gaps between abrasive grains, allowing problems like glazing and loading to occur during the cutting operation and losing the cutting ability. If the average particle size is more than 500 μm, there may arise problems, for example, magnet pieces cut thereby may have rough surfaces.

Preferably the blade section 20 contains abrasive grains in a fraction of 10 to 80% by volume, and more preferably 15 to 75% by volume. Less than 10 vol % means a less fraction of abrasive grains contributing to cutting whereas more than 80 vol % of abrasive grains may increase unwanted loading during the cutting operation. Either situation increases resistance during the cutting operation and so the cutting speed must be reduced. Depending on a particular application, the volume fraction of abrasive grains is controlled by admixing a suitable ingredient other than abrasive grains.

Figure 1A:
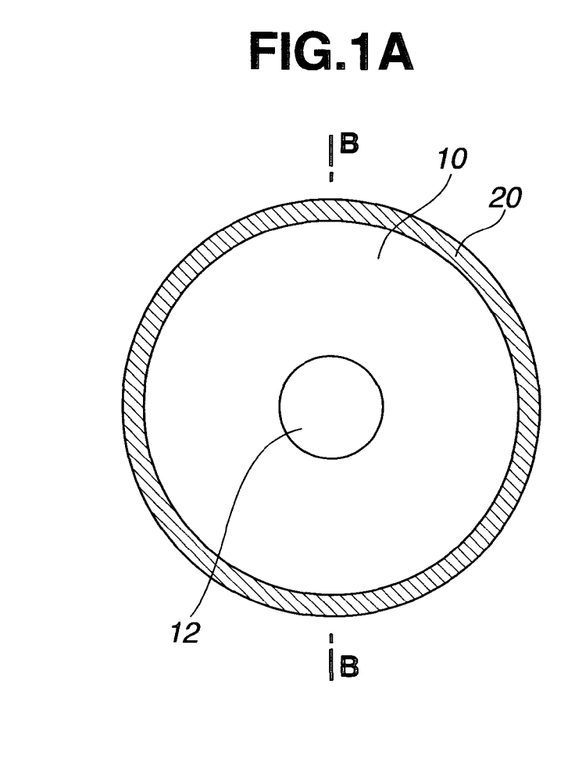
Figure 1B:
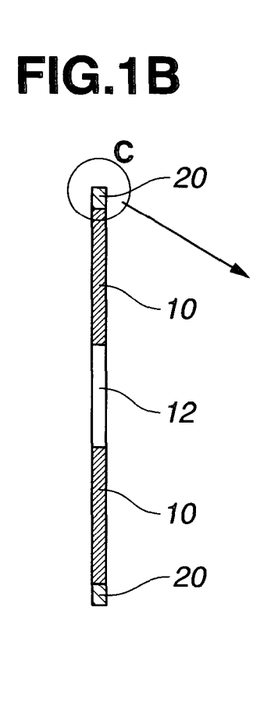
Figure 1C:
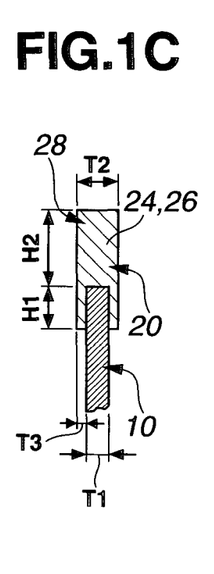
Figure 1D:
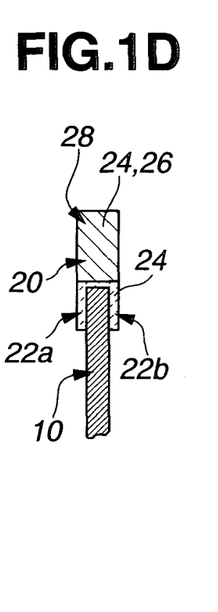
Figure 1E:
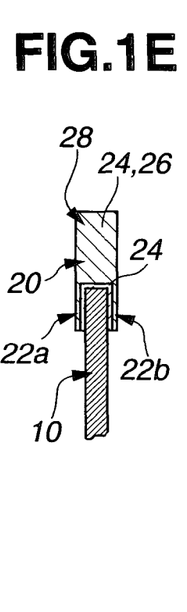

As shown in FIGS. 1C to 1E, the blade section 20 consists of a pair of clamp legs 22a, 22b which clamp the outer rim of the base 10 therebetween in an axial direction and a body 28 which extends radially outward beyond the outer rim (periphery) of the base 10. (This division is for convenience of description because the legs and the body are integral to form the blade section.) The thickness of the blade section 20 is greater than the thickness of the base 10.

More specifically, the clamp legs 22a, 22b of the blade section 20 which clamp the outer rim of the base 10 therebetween each preferably have a length H1 of 0.1 to 10 mm, and more preferably 0.5 to 5 mm. The legs 22a, 22b each preferably have a thickness T3 of at least 5 µm (=0.005 mm), more preferably 5 to 2,000 µm, and even more preferably 10 to 1,000 µm. Then the total thickness of legs 22a, 22b is preferably at least 0.01 mm, more preferably 0.01 to 4 mm, and even more preferably 0.02 to 2 mm. The blade section 20 is thicker than the base 10 by this total thickness. If the length H1 of clamp legs 22a, 22b is less than 0.1 mm, they are still effective for preventing the rim of the cemented carbide base from being chipped or cracked, but less effective for reinforcing the base and sometimes fail to prevent the base from being deformed by the cutting resistance. If the length H1 exceeds 10 mm, reinforcement of the base is made at the sacrifice of expense. If the thickness T3 of clamp leg is less than 5 µm, such thin legs may fail to enhance the mechanical strength of the base or to effectively discharge the swarf sludge.

The base may be chamfered or notched at its outer peripheral region for the purposes of preventing fracture and cracking during the cutting operation and enhancing electroplated strength. A proper mode of chamfering such as C-chamfering or R-chamfering may be selected in accordance with a particular situation. Also notches may be selected from triangular and rectangular depressions and other shapes, depending on parameters such as base thickness and abrasive layer height.

As shown in FIGS. 1C to 1E, the clamp legs 22a, 22b may consist of a metal bond 24 and abrasive grains 26 (FIG. 1C), consist of metal bond 24 (FIG. 1D), or include an underlying layer consisting of metal bond 24 covering the base 10 and an overlying layer consisting of metal bond 24 and abrasive grains 26 (FIG. 1E).

On the other hand, the body 28 which extends radially outward beyond the periphery of the base 10 has a length H2 which is preferably 0.1 to 10 mm, and more preferably 0.3 to 8 mm, though may vary with the size of abrasive grains to be bound. If the body length H2 is less than 0.1 mm, the blade section may be consumed within a short time by impacts and wears during the cutting operation, leading to a cutting wheel with a short lifetime. If the body length H2 exceeds 10 mm, the blade section may become susceptible to deformation, though dependent on the blade thickness (T2 in FIG. 1), resulting in cut magnet pieces with wavy cut surfaces and hence, worsening dimensional accuracy. The body 28 of the blade section consists essentially of metal bond 24 and abrasive grains 26.

The method of forming the blade section 20 on the periphery of the base 10 may be either electroplating or brazing. By electroplating or brazing, at least one metal selected from Ni, Fe, Co, Cu, and Sn, an alloy thereof, or an alloy of such a metal with P is deposited on the cemented carbide base while binding abrasive grains therewith.

The method of depositing the metal bond by plating is generally classified into two, an electroplating method and an electroless plating method. In the practice of the invention, the electroplating method is selected at the present because it is easy to control internal stresses remaining in the metal bond and needs low production costs.

Electroplating may be carried out by any well-known technique using a well-known electroplating bath for depositing the above-listed single metal or alloy and ordinary plating conditions commonly used for that bath.

When the metal bond is deposited by electroplating, abrasive grains must be bonded together and bound to the base by the metal bond at the same time. This may be achieved by a composite plating method using a composite plating bath having abrasive grains dispersed therein for co-depositing abrasive grains simultaneous with metal deposition as well as the following methods.

(i) Method of applying a conductive adhesive to a selected portion of the base rim and bonding abrasive grains thereto with the adhesive, followed by plating.

(ii) Method of applying a mixture of a conductive adhesive and abrasive grains to a selected portion of the base rim, followed by plating.

(iii) Method of clamping the base with a jig provided with a narrow space corresponding to an abrasive layer, filling the space with abrasive grains, and causing friction forces to be generated among abrasive grains, the jig and the base to retain the abrasive grains, followed by plating.

(iv) Method of cladding abrasive grains with a magnetic material such as nickel via plating or sputtering, and holding the clad grains to the base rim via magnetic attraction, followed by plating. Means of inducing magnetic forces through the base may be one known from JP-A 7-207254 or by clamping the base with a jig having a permanent magnet built therein.

(v) Method of cladding abrasive grains with a ductile metal such as nickel or copper, optionally mixing the clad grains with a metal powder, placing the clad grains alone or the clad grains/metal powder mixture on the base rim, placing in a mold, and applying pressure for bonding.

It is noted that abrasive grains may be previously coated (or clad) by electroless copper or nickel plating in order to increase the bond strength of abrasive grains bonded by subsequent plating.

In the practice of the invention, when the metal bond is deposited by the electroplating method, the metal as deposited should preferably have a stress between $-2 \times 10^8$ Pa (compression stress) and $+2 \times 10^8$ Pa (tensile stress), and more preferably between $-1.8 \times 10^8$ Pa and $+1.8 \times 10^8$ Pa. It is difficult to measure directly the stress introduced in the base by electroplating. Then, the metal is deposited on a test piece (e.g., a test strip used in commercial strip electrodeposit stress meters or a test piece used in internal stress measurement by a spiral contractometer) under the same conditions as the plating conditions under which the metal is deposited on the base rim, before the stress of the plating film is measured. These data are compared with the results of a cutting test as in Example, and an appropriate range of stress in the plating film is determined. As a consequence, a stress is found to fall in the range between $-2 \times 10^8$ Pa and $+2 \times 10^8$ Pa, provided that negative values represent the compression stress and positive values represent the tensile stress in the plating film. If a plating film has a stress outside the range, the blade section or cemented carbide base may be deformed by the stress, or deformation by the cutting resistance may readily occur. As used herein, the term "stress" in a plating film refers to the internal stress which is left, when a plating film on an object expands or contracts, as a result of expansion or contraction of the plating film being suppressed by the object to be plated.

The stress in the plating film may be controlled by suitable means. For example, in single metal plating such as copper or nickel plating, typically nickel sulfamate plating, the stress may be controlled by selecting the concentration of the active ingredient or nickel sulfamate, the current density during plating, and the temperature of the plating bath in appropriate ranges, and adding an organic additive such as o-benzenesulfonimide or p-toluenesulfonamide, or an element such as Zn or S. Besides, in alloy plating such as Ni—Fe alloy, Ni—Mn alloy, Ni—P alloy, Ni—Co alloy or Ni—Sn alloy, the stress may be controlled by selecting the content of Fe, Mn, P, Co or Sn in the alloy, the temperature of the plating bath, and other parameters in appropriate ranges. In the case of alloy plating, addition of organic additives may, of course, be effective for stress control.

Examples of the preferred plating bath are given below.

| Nickel sulfamate plating bath | |
| --- | --- |
| Nickel sulfamate | 100-600 g/L |
| Nickel sulfate | 50-250 g/L |
| Nickel chloride | 5-70 g/L |
| Boric acid | 30-40 g/L |
| o-Benzenesulfonimide | appropriate |
| Nickel-cobalt alloy sulfamate plating bath | |
| Nickel sulfamate | 250-600 g/L |
| Cobalt chloride | 2-10 g/L |
| Boric acid | 30-40 g/L |
| o-Benzenesulfonimide | appropriate |
| Watts nickel-iron alloy plating bath | |
| Nickel sulfate | 50-200 g/L |
| Nickel chloride | 20-100 g/L |
| Iron sulfate | 5-20 g/L |
| Boric acid | 30-40 g/L |
| Sodium ascorbate | appropriate |
| o-Benzenesulfonimide | appropriate |
| Watts nickel-phosphorus alloy plating bath | |
| Nickel sulfate | 50-200 g/L |
| Nickel chloride | 20-100 g/L |
| Ortho-phosphoric acid | 10-80 g/L |
| Phosphorous acid | 1-30 g/L |
| o-Benzenesulfonimide | appropriate |
| Copper pyrophosphate plating bath | |
| Copper pyrophosphate | 30-150 g/L |
| Potassium pyrophosphate | 100-450 g/L |
| Aqueous ammonia | 1-20 ml/L |
| Potassium nitrate | 5-20 g/L |

In the other embodiment, the blade section is formed by brazing abrasive grains with a metal bond onto the base rim. This may be carried out by premixing a braze with abrasive grains and applying the premix to the base rim or by premixing a braze with abrasive grains and placing the premix and the base in a mold and applying pressure to bind the abrasive grains to the base rim. Further, the metal bond may be deposited on the base periphery by electroplating, to form an undercoat capable of facilitating subsequent brazing, for the purposes of enhancing the bond strength between the abrasive layer and the base and substantially preventing the base from being deflected or waved by strains associated with brazing.

The braze used herein must have good wetting properties to cemented carbides. Those braze materials having a melting point of up to 1,300° C., especially up to 1,100° C. are preferred because the deformation and strength loss of the base are minimized.

Either of the above embodiments facilitates both the attachment of diamond grains, CBN grains or a mixture of diamond grains and CBN grains to the periphery of the base and the enhancement of mechanical strength of the thin base at the same time. The preferred dimensions of the base include a thickness of 0.1 to 1 mm and an outer diameter of up to 200 mm, because a base blank can be machined to such dimensions at a high accuracy and the resulting wheel can be used to cut rare earth sintered magnet blocks at a high accuracy over a long term in a stable manner. It is difficult to machine out a base disc of less than 0.1 mm thick at a high accuracy, because such an extremely thin disc experiences substantial axial curvatures independent of its outer diameter. A thickness in excess of 1 mm leads to an unacceptable cutting cost, failing to achieve the object of the invention. The outer diameter of up to 200 mm is due to the limitation of the current cemented carbide manufacturing and machining technology. The diameter of the central bore is in the range of 30 to 80 mm which corresponds to the diameter of a shaft of a grinding machine on which the cutting wheel is mounted.

On use of the outer blade cutting wheel of the invention, various workpieces may be cut thereby. Typical workpieces include R—Co rare earth sintered magnets and R—Fe—B rare earth sintered magnets wherein R is at least one of rare earth elements inclusive of Y. These magnets are prepared as follows.

R—Co rare earth sintered magnets include $RCo_5$ and $R_2Co_{17}$ systems. Of these, the $R_2Co_{17}$ magnets have a composition (in % by weight) comprising 20-28% R, 5-30% Fe, 3-10% Cu, 1-5% Zr, and the balance of Co. They are prepared by weighing source materials in such a ratio, melting them, casting the melt, and finely pulverizing the alloy into an average particle size of 1-20 μm, yielding a $R_2Co_{17}$ magnet powder. The powder is then compacted in a magnetic field and sintered at 1,100-1,250° C. for 0.5-5 hours, followed by solution treatment at a temperature lower than the sintering temperature by 0-50° C. for 0.5-5 hours, and aging treatment of holding at 700-950° C. for a certain time and subsequent cooling.

R—Fe—B rare earth sintered magnets have a composition (in % by weight) comprising 5-40% R, 50-90% Fe, and 0.2-8% B. An additive element or elements may be added thereto for improving magnetic properties and corrosion resistance, the additive elements being selected from C, Al, Si, Ti, V, Cr, Mn, Co, Ni, Cu, Zn, Ga, Zr, Nb, Mo, Ag, Sn, Hf, Ta, W, etc. The amount of additive element is up to 30% by weight for Co, and up to 8% by weight for the other elements. The magnets are prepared by weighing source materials in such a ratio, melting them, casting the melt, and finely pulverizing the alloy into an average particle size of 1-20 μm, yielding a R—Fe—B magnet powder. The powder is then compacted in a magnetic field and sintered at 1,000-1,200° C. for 0.5-5 hours, followed by aging treatment of holding at 400-1,000° C. for a certain time and subsequent cooling.

EXAMPLE

Examples of the invention are given below by way of illustration and not by way of limitation.

In Examples, the Young's modulus, Vickers hardness and plating stress of a metal bond are measured by the following methods.

Young's Modulus

A metal bond was deposited on a cemented carbide base to a thickness of about 2 mm. The bond deposit was peeled therefrom and machined into a specimen of 10×40×1 mm (thick). The Young's modulus of the specimen was measured according to the bending resonance method of JIS R1605.

Vickers Hardness

The Vickers hardness of the specimen prepared above was measured by a micro-Vickers hardness tester according to the Vickers hardness test of JIS 81610.

Plating Stress

A metal bond was deposited on a test strip (used in strip electrodeposit stress meters) to a thickness of about 50 μm, after which a plating stress was measured.

Example 1

Figure 2:
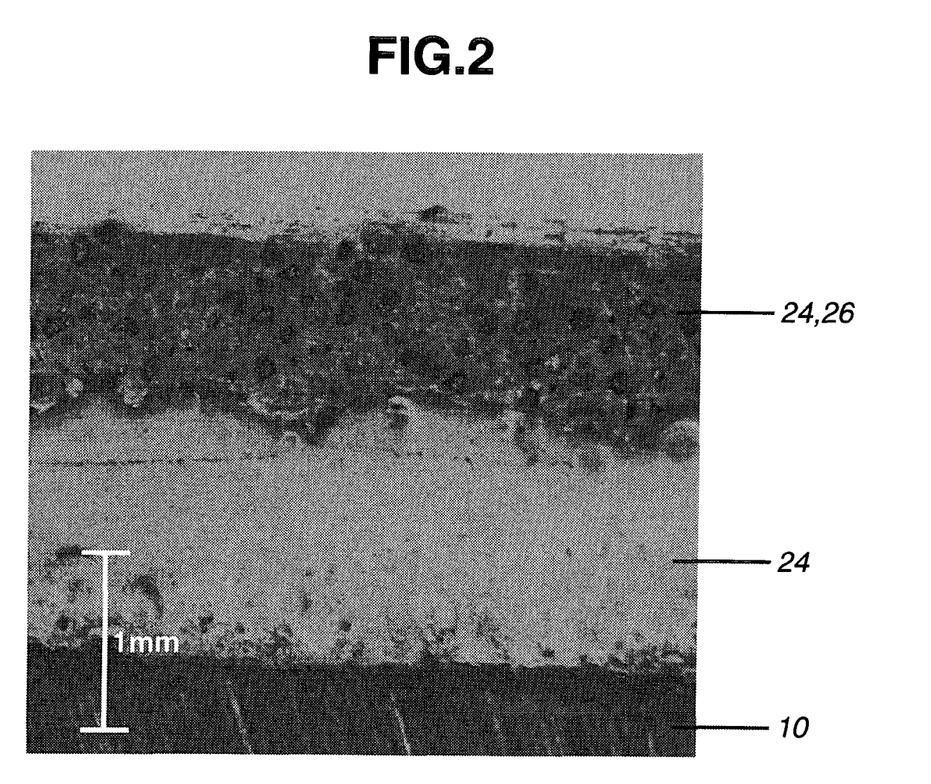
FIG. 2 is a photomicrograph of a blade section of a grain-co-electrodeposited outer blade cutting wheel in Example 1.

A cemented carbide consisting of 90 wt % WC and 10 wt % Co was machined into an annular thin disc having an outer diameter of 125 mm, an inner diameter of 40 mm, and a thickness of 0.3 mm, which served as a base. The base was masked with adhesive tape so that only a circumferential region of either surface extending 1.5 mm inward from the outer periphery was exposed. The base was immersed in a commercially available aqueous alkaline solution at 40° C. for 10 minutes for degreasing, washed with water, and immersed in an aqueous solution of 30 to 80 g/L of sodium pyrophosphate at 50° C. where electrolysis was effected at a current density of 2 to 8 A/dm$^2$. The cemented carbide base was ultrasonic washed in deionized water and held by a jig for plating. In accordance with method (iv) mentioned above, nickel-clad diamond grains having an average particle size of 130 μm were disposed in contact with the periphery of the base. The base was immersed in a nickel sulfamate plating bath at 50° C. where a different quantity of electricity was conducted at a current density of 5 to 20 A/dm$^2$ for electroplating. After water washing and removal from the jig, a blade section was lapped by a lapping machine to a thickness of 0.4 mm. In this way, there were obtained three types of outer blade cutting wheels with abrasive grains bound by electroplating, having a different internal residual stress. FIG. 2 is a photomicrograph showing the outer appearance of the blade section having the cross section shown in FIG. 1D. Illustrated in FIG. 2 are a cemented carbide base 10, a layer (leg) of metal bond 24, and a layer (body) of metal bond 24 and abrasive grains 26. The metal bonds had a Young's modulus of $2.0 \times 10^{11}$ Pa, a Vickers hardness of Hv 318, a density of 8.8 g/cm$^3$, and an internal residual stress of $-1.4 \times 10^8$ Pa, $0.53 \times 10^8$ Pa, and $2.0 \times 10^8$ Pa.

Example 2

A cemented carbide consisting of 90 wt % WC and 10 wt % Co was machined into an annular thin disc having an outer diameter of 125 mm, an inner diameter of 40 mm, and a thickness of 0.3 mm, which served as a base. The base was masked with adhesive tape so that only a circumferential region of either surface extending 1.5 mm inward from the outer periphery was exposed. The base was immersed in a commercially available aqueous alkaline solution at 40° C. for 10 minutes for degreasing, washed with water, and immersed in an aqueous solution of 30 to 80 g/L of sodium pyrophosphate at 50° C. where electrolysis was effected at a current density of 2 to 8 A/dm$^2$. The cemented carbide base was ultrasonic washed in deionized water and held by a jig for plating. In accordance with method (iv) mentioned above, nickel-clad CBN grains having an average particle size of 130 μm were disposed in contact with the periphery of the base. The base was immersed in a nickel sulfamate plating bath at 50° C. where electricity was conducted at a current density of 5 to 20 A/dm$^2$ for electroplating. After water washing and removal from the jig, a blade section was lapped by a lapping machine to a thickness of 0.4 mm. In this way, there was obtained an outer blade cutting wheel with abrasive grains bound by electroplating. The metal bond had a Young's modulus of $2.0 \times 10^{11}$ Pa, a Vickers hardness of Hv 318, a density of 8.8 g/cm$^3$, and an internal residual stress of $0.5 \times 10^8$ Pa.

Example 3

A cemented carbide consisting of 90 wt % WC and 10 wt % Co was machined into an annular thin disc having an outer diameter of 125 mm, an inner diameter of 40 mm, and a thickness of 0.3 mm, which served as a base. The base was masked with adhesive tape so that only a circumferential region of either surface extending 1.5 mm inward from the outer periphery was exposed. The base was immersed in a commercially available aqueous alkaline solution at 40° C. for 10 minutes for degreasing, washed with water, and immersed in an aqueous solution of 30 to 80 g/L of sodium pyrophosphate at 50° C. where electrolysis was effected at a current density of 2 to 8 A/dm$^2$. The cemented carbide base was ultrasonic washed in deionized water and held by a jig for plating. As in Example 1, nickel-clad diamond grains having an average particle size of 130 μm were disposed in contact with the periphery of the base. The base was immersed in a nickel-cobalt alloy sulfamate plating bath at 50° C. where electricity was conducted at a current density of 5 to 20 A/dm$^2$ for electroplating. After water washing and removal from the jig, a blade section was lapped by a lapping machine to a thickness of 0.4 mm. In this way, there was obtained an outer blade cutting wheel with abrasive grains bound by electroplating. The metal bond had a Young's modulus of $2.4 \times 10^{11}$ Pa, a Vickers hardness of Hv 480, a density of 8.8 g/cm$^3$, and an internal residual stress of $4.6 \times 10^7$ Pa.

Example 4

A cemented carbide consisting of 90 wt % WC and 10 wt % Co was machined into an annular thin disc having an outer diameter of 125 mm, an inner diameter of 40 mm, and a thickness of 0.3 mm, which served as a base. The base was masked with adhesive tape so that only a circumferential region of either surface extending 1.5 mm inward from the outer periphery was exposed. The base was immersed in a commercially available aqueous alkaline solution at 40° C. for 10 minutes for degreasing, washed with water, and immersed in an aqueous solution of 30 to 80 g/L of sodium pyrophosphate at 50° C. where electrolysis was effected at a current density of 2 to 8 A/dm$^2$. The cemented carbide base was ultrasonic washed in deionized water and held by a jig for plating. As in Example 1, nickel-clad diamond grains having an average particle size of 130 μm were disposed in contact with the periphery of the base. The base was immersed in a Watts nickel-iron alloy plating bath at 60° C. where a different quantity of electricity was conducted at a current density of 5 to 20 A/dm$^2$ for electroplating. After water washing and removal from the jig, a blade section was lapped by a lapping machine to a thickness of 0.4 mm. In this way, there were obtained two types of outer blade cutting wheels with abrasive grains bound by electroplating, having a different internal residual stress. The metal bonds had a Young's modulus of $1.4 \times 10^{11}$ Pa, a Vickers hardness of Hv 422, a density of 8.7 g/cm$^3$, and an internal residual stress of $-0.5 \times 10^8$ Pa and $1.5 \times 10^8$ Pa.

Example 5

A cemented carbide consisting of 90 wt % WC and 10 wt % Co was machined into an annular thin disc having an outer diameter of 125 mm, an inner diameter of 40 mm, and a thickness of 0.3 mm, which served as a base. The base was masked with adhesive tape so that only a circumferential region of either surface extending 1.5 mm inward from the outer periphery was exposed. The base was immersed in a commercially available aqueous alkaline solution at 40° C. for 10 minutes for degreasing, washed with water, and immersed in an aqueous solution of 30 to 80 g/L of sodium pyrophosphate at 50° C. where electrolysis was effected at a current density of 2 to 8 A/dm². The cemented carbide base was ultrasonic washed in deionized water and held by a jig for plating. As in Example 1, nickel-clad diamond grains having an average particle size of 130 μm were disposed in contact with the periphery of the base. The base was immersed in a Watts nickel-phosphorus alloy plating bath of a different composition at 60° C. where electricity was conducted at a current density of 5 to 20 A/dm² for electroplating. After water washing and removal from the jig, a blade section was lapped by a lapping machine to a thickness of 0.4 mm. In this way, there were obtained two types of outer blade cutting wheels with abrasive grains bound by electroplating, having a different Vickers hardness. The metal bonds had a Young's modulus of $2.1 \times 10^{11}$ Pa, a Vickers hardness of Hv 440 and Hv 528, a density of 8.8 g/cm³, and an internal residual stress of $0.9 \times 10^7$ Pa.

Example 6

A cemented carbide consisting of 90 wt % WC and 10 wt % Co was machined into an annular thin disc having an outer diameter of 125 mm, an inner diameter of 40 mm, and a thickness of 0.3 mm, which served as a base. The base was masked with adhesive tape so that only a circumferential region of either surface extending 1.5 mm inward from the outer periphery was exposed. The base was immersed in a commercially available aqueous alkaline solution at 40° C. for 10 minutes for degreasing, washed with water, and immersed in an aqueous solution of 30 to 80 g/L of sodium pyrophosphate at 50° C. where electrolysis was effected at a current density of 2 to 8 A/dm². The cemented carbide base was ultrasonic washed in deionized water and held by a jig for plating. As in Example 1, nickel-clad diamond grains having an average particle size of 130 μm were disposed in contact with the periphery of the base. The base was immersed in a copper pyrophosphate plating bath at 50° C. where electricity was conducted at a current density of 5 to 20 A/dm² for electroplating. After water washing and removal from the jig, a blade section was lapped by a lapping machine to a thickness of 0.4 mm. In this way, there was obtained an outer blade cutting wheel with abrasive grains bound by electroplating. The metal bond had a Young's modulus of $1.1 \times 10^{11}$ Pa, a Vickers hardness of Hv 150, a density of 8.8 g/cm³, and an internal residual stress of $0.5 \times 10^7$ Pa.

All the cutting wheels of Examples 1 to 6 were suited for cutting rare earth sintered magnet blocks.

Comparative Example 1

A cemented carbide consisting of 90 wt % WC and 10 wt % Co was machined into an annular thin disc having an outer diameter of 125 mm, an inner diameter of 40 mm, and a thickness of 0.3 mm, which served as a base. The base was placed in a mold, which was filled with a mixture of 75% by volume of a powdered phenolic resin as a resin bond and 25% by volume of diamond grains having an average particle size of 130 μm. The mixture was pressure molded about the base and heated in the mold at 180° C. for 2 hours for curing. After cooling and removal from the mold, a blade section was lapped by a lapping machine to a thickness of 0.4 mm. In this way, there was obtained a resin bonded cemented carbide outer blade cutting wheel. The bond had a Young's modulus of $3.0 \times 10^9$ Pa, a Vickers hardness of Hv 50, and a density of 4.3 g/cm³.

Comparative Example 2

A cemented carbide consisting of 90 wt % WC and 10 wt % Co was machined into an annular thin disc having an outer diameter of 125 mm, an inner diameter of 40 mm, and a thickness of 0.3 mm, which served as a base. The base was placed in a mold, which was filled with a mixture of 75% by volume of a WC powder/Co powder mix as a bond and 25% by volume of diamond grains having an average particle size of 130 μm. Pressure molding was performed. The base was removed from the mold, followed by thickness adjustment and heat treatment in an argon atmosphere. A blade section was lapped by a lapping machine to a thickness of 0.4 mm. In this way, there was obtained a sintered, cemented carbide base outer blade cutting wheel. The bond had a Young's modulus of $5.1 \times 10^{11}$ Pa, a Vickers hardness of Hv 687, and a density of 13.1 g/cm³.

A cutting test was performed. A multiple wheel assembly was constructed by arranging two outer blade cutting wheels from each of Examples 1 to 6 and Comparative Examples 1 and 2 at a spacing of 1.5 mm. The assembly was dressed until abrasive grains became exposing. A number of workpieces in the form of Nd—Fe—B rare earth sintered magnet of 40 mm wide×100 mm long×20 mm high were successively cut by the assembly while rotating the assembly at 5,000 rpm.

Figure 3:
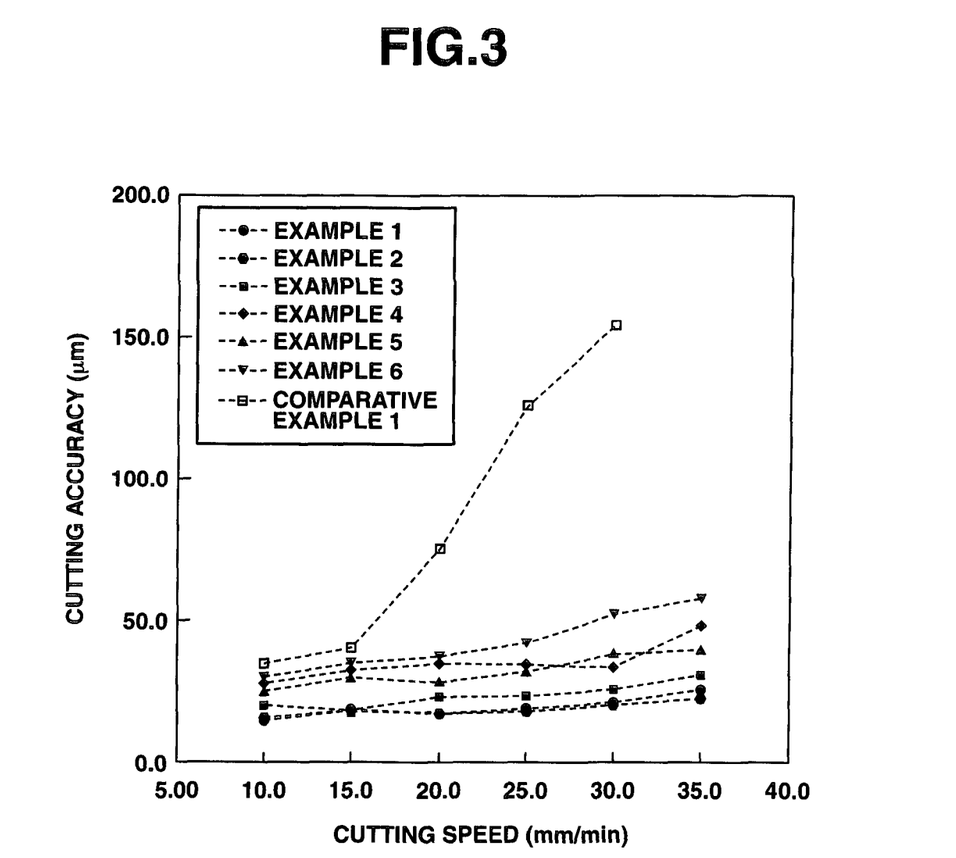
FIG. 3 is a diagram showing cutting accuracy versus cutting speed for Example 1 (grain-co-electrodeposited cutting wheel with an internal residual stress of $0.53\times10^7$ Pa), Example 2, Example 3, Example 4 (grain-co-electrodeposited cutting wheel with an internal residual stress of $1.5\times10^8$ Pa), Example 5 (grain-co-electrodeposited cutting wheel with a Vickers hardness Hv of 440), Example 6, and Comparative Example 1.

FIG. 3 is a diagram illustrating a cutting accuracy versus a cutting speed. After 50 magnet pieces were cut from the start at a cutting speed of 10 mm/min, five magnet pieces were cut while varying a cutting speed from 10 mm/min to 35 mm/min. For each piece, the thickness at five points, a central point and four corner points was measured by a micro-meter. The difference between maximum and minimum values among these five points for each piece is a cutting accuracy (μm). An average of the cutting accuracies of five pieces was computed and plotted in the diagram.

Figure 4:
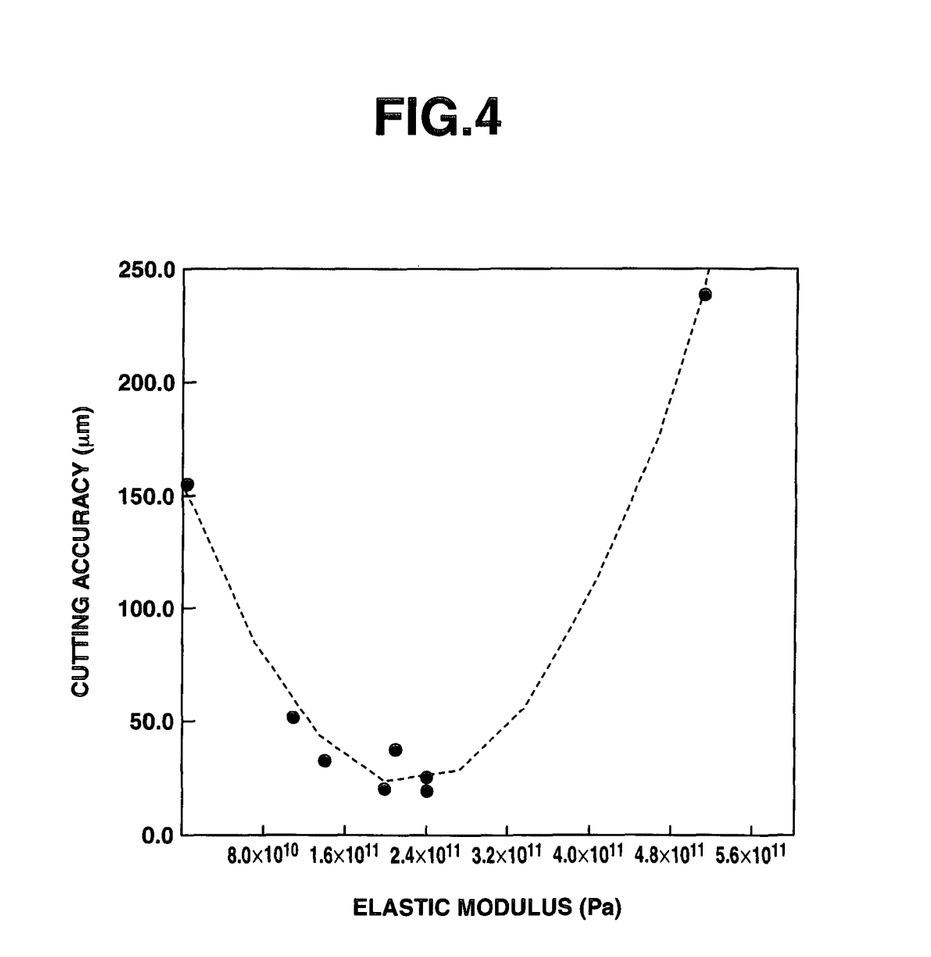
FIG. 4 is a diagram showing cutting accuracy versus elastic modulus (Young's modulus) for Examples 1 to 6 and Comparative Examples 1 and 2.
Figure 5:
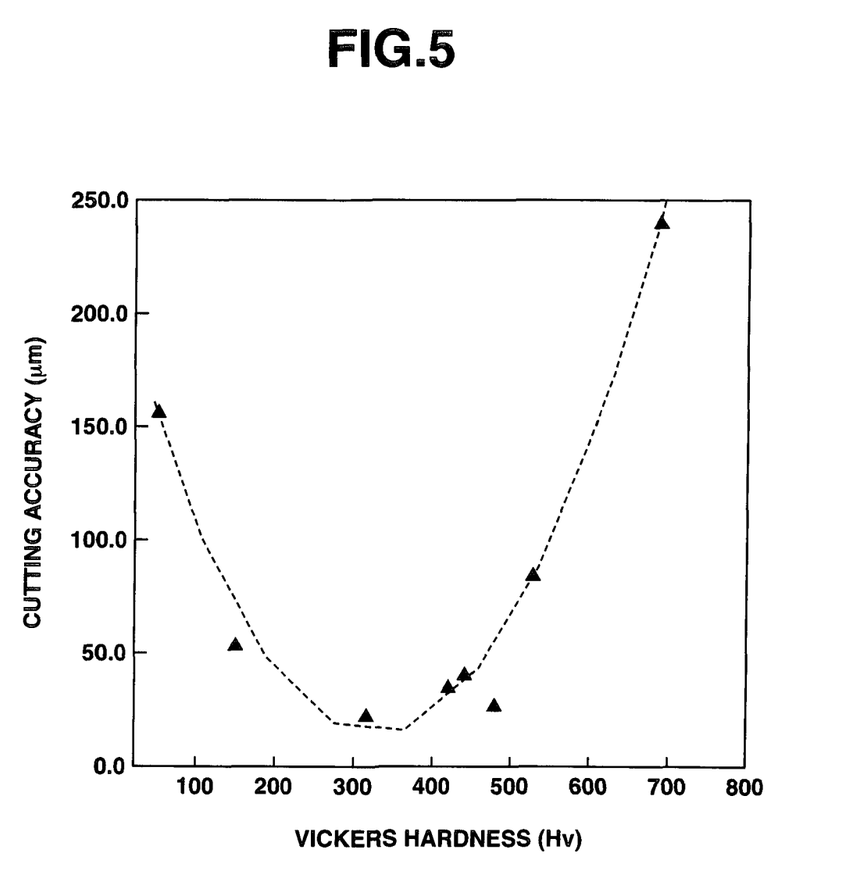
FIG. 5 is a diagram showing cutting accuracy versus Vickers hardness for Examples 1 to 6 and Comparative Examples 1 and 2.
Figure 6:
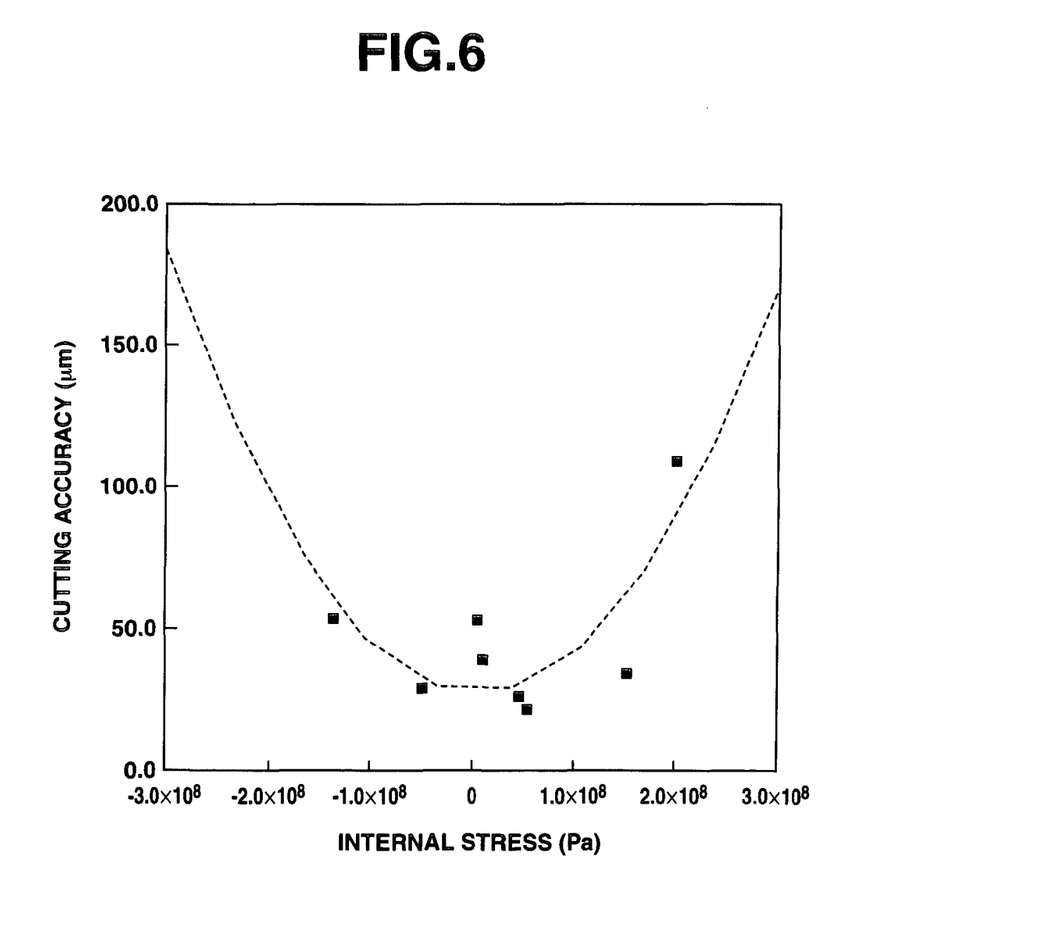
FIG. 6 is a diagram showing cutting accuracy versus internal stress for Examples 1 to 6.

FIGS. 4, 5, and 6 are diagrams illustrating a cutting accuracy versus an elastic modulus (Young's modulus), Vickers hardness, and internal stress, respectively. For each of five magnet pieces cut at a speed of 30 mm/min, the thickness at five points, a central point and four corner points was measured by a micro-meter. The difference between maximum and minimum values among these five points for each piece is a cutting accuracy (μm). An average of the cutting accuracies of five pieces was computed and plotted in the diagrams.

FIG. 3 illustrates a cutting accuracy versus a cutting speed for Examples 1 to 6 and Comparative Example 1. In Comparative Example 1, as the cutting speed increases, the cutting accuracy increases substantially. In Examples, the cutting accuracy is less than 60 μm for all samples, despite more or less magnitudes of difference, indicating that the dimensional variation is minimized even on high speed cutting.

FIG. 4 illustrates a cutting accuracy versus an elastic modulus (Young's modulus) of bond for Examples 1 to 6 and Comparative Examples 1 and 2. Comparative Example 1 had a cutting accuracy above 150 μm and Comparative Example 2 had a cutting accuracy approximate to 250 μm, both exceeding the acceptable cutting accuracy of 100 μm. In contrast, Examples 1 to 6 had satisfactory cutting accuracy values of less than 100 μm. The dotted line curve in the diagram is a regression curve calculated from these data, and it is estimated from the regression curve that the range of Young's modulus providing an acceptable cutting accuracy is between $0.7 \times 10^{11}$ Pa and $4.0 \times 10^{11}$ Pa.

FIG. 5 illustrates a cutting accuracy versus an Vickers hardness of bond for Examples 1 to 6 and Comparative Examples 1 and 2. Comparative Example 1 had a cutting accuracy above 150 μm. In contrast, Examples 1 to 6 had satisfactory cutting accuracy values of less than 100 μm, indicating satisfactory dimensional variations. The dotted line curve in the diagram is a regression curve calculated from these data, and it is estimated from the regression curve that the range of Vickers hardness providing a cutting accuracy of up to 100 μm is between Hv 100 and Hv 550.

FIG. 6 illustrates a cutting accuracy versus an internal stress of bond for Examples 1 to 6. It is estimated from the regression curve in the diagram that the range of internal stress providing a cutting accuracy of up to 100 μm is between $-2.0 \times 10^8$ Pa and $2.0 \times 10^8$ Pa.

It has been demonstrated that according to the invention, the blade section is improved in mechanical strength and the overall outer blade cutting wheel is improved in mechanical rigidity or robustness. As a result, even when the thickness of the blade section is reduced, the concomitant reduction of cutting accuracy during high-speed cutting is minimized.

Japanese Patent Application No. 2007-339212 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing an outer blade cutting wheel comprising providing a base in the form of an annular thin disc of cemented carbide having an outer diameter of 80 to 200 mm defining an outer periphery, an inner diameter of 30 to 80 mm, and a thickness of 0.1 to 1.0 mm, and electroplating a metal bond together with abrasive grains to deposit on the outer periphery of said base an electroplated layer in which the abrasive grains are bound with the metal bond, the abrasive grains comprising diamond grains, CBN grains or a mixture of diamond grains and CBN grains, the metal bond having a Young's modulus of $0.7 \times 10^{11}$ to $4.0 \times 10^{11}$ Pa, said electroplated layer having a thickness which is greater than the thickness of said base by at least 0.01 mm and serving as a blade section, wherein said metal bond comprises an alloy which is one of the group consisting of:

an alloy consisting of Ni and Zn, an alloy consisting of Ni and S, an alloy consisting of Ni and Sn, an alloy consisting of Ni, Sn and S, an alloy consisting of Ni and phosphorus, an alloy consisting of Ni, phosphorous and Zn, an alloy consisting of Ni, phosphorous and S, an alloy consisting of Ni and Mn, and an alloy consisting of Ni, Mn and S.

2. The method of claim 1 wherein the metal bond as deposited on the base by electroplating has an internal residual stress between $-2 \times 10^8$ Pa and $2 \times 10^8$ Pa.

3. The method of claim 1 wherein said metal bond has a Vickers hardness of 100 to 550 and a density of 2.5 to 12 g/cm$^3$.

4. The method of claim 1 wherein the abrasive grains are clad with a magnetic material formed by plating or sputtering, or a ductile metal.

* * * * *